A. Rickart,
Turning Regular Forms,
№ 21,443. Patented Sep. 7, 1858.

UNITED STATES PATENT OFFICE.

ALEXANDER RICKART, OF SCHOHARIE, NEW YORK.

MACHINE FOR TURNING HUBS.

Specification of Letters Patent No. 21,443, dated September 7, 1858.

*To all whom it may concern:*

Be it known that I, ALEXANDER RICKART, of Schoharie, in the county of Schoharie and State of New York, have invented a new and Improved Machine for Turning Hubs and Wheels; and I do hereby declare that the following is a full, clear, and exact description of the same, reference being had to the annexed drawings, making a part of this specification, in which—

Figure 1:
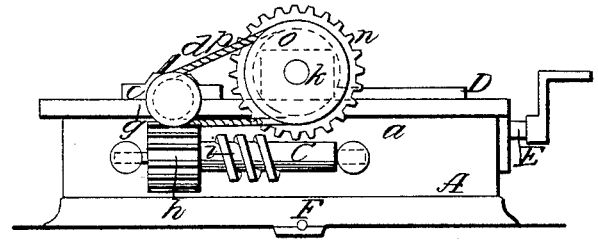
Figure 2:
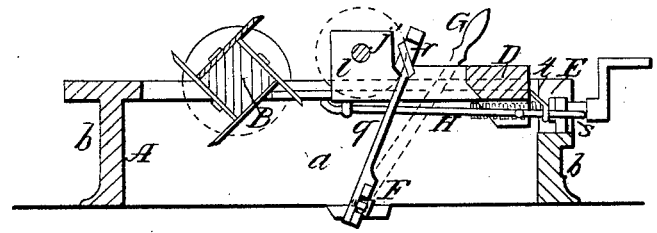
Figure 3:
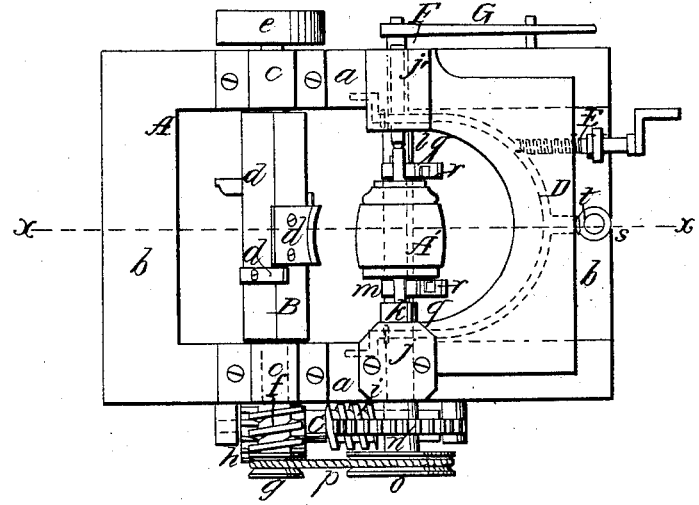

Figure 1, is a side view of my improvement. Fig. 2, is a longitudinal vertical section of ditto, taken in the line $x$, $x$, Fig. 3. Fig. 3, is a plan or top view of ditto.

Similar letters of reference indicate corresponding parts in the several figures.

This invention relates to an improvement in a hub turning machine for which Letters Patent were granted to me bearing date July 1st, 1857.

The object of the within described improvement is to obtain, by far simpler means, the same result that is obtained by the patented machine above alluded to.

To enable those skilled in the art to fully understand and construct my invention I will proceed to describe it.

A represents the bed of the machine which is simply formed of two parallel sides $a$, $a$, connected by end pieces $b$, $b$.

B, is a shaft which is placed transversely on the bed A, fitted in permanent bearings $c$, $c$. This shaft has cutters $d$, attached to it, the edges of which are made to correspond to the desired form of the hub. On one end of the shaft B, a driving pulley $e$, is placed, and a screw $f$, is formed on the opposite end and a pulley $g$, is also placed on the shaft adjoining the screw, see Fig. 3. The screw $f$, gears into a worm wheel $h$, which is placed on one end of a horizontal shaft C, which has its bearings at one side of the bed A, as shown clearly in Figs. 1 and 3. On the shaft C, a screw $i$, is formed, also clearly shown in Figs. 1 and 3.

D, is a carriage which is placed on the bed A, and allowed to slide freely forward and backward thereon and actuated by the operator by means of a screw E. On the carriage D, two heads $j$, $j'$, are secured. In the head $j$, a mandrel $k$, is placed, and in the head $j'$, a center arbor $l$. Between the mandrel $k$, and the center $l$, a mandrel $m$, is placed, and the block or "stuff" A′, to be turned is bored centrally and placed on mandrel $m$, previous of course to its being placed between the center $l$, and mandrel $k$. On the outer end of the mandrel $k$, a worm wheel $n$, is placed, the teeth of which correspond to the thread of the screw $i$, on shaft C. A pulley $o$, is also placed on the outer end of mandrel $k$, and a band $p$, passes around the pulley $o$, and also around the pulley $q$, on shaft B.

To the lower part of the bed A, a transverse shaft F, is attached. This shaft is provided at one end with a lever or handle G, and two arms $q$, $q$, are attached to shaft F, said arms having each a cutter $r$, attached to its upper end. The arms $q$, are so attached to the shaft F, that they may be adjusted nearer to or farther apart as may be desired.

To the under side of the carriage D, a semi-circular rod H, is attached, the inner parts of said rod near its ends being secured by staples to the carriage. The ends of the rods are curved a little upward as shown in Fig. 2, and a projecting arm $s$, having a pawl $t$, attached is at the outer part of the rod see more particularly Fig. 2.

The operation is as follows: The block A′, is placed on the mandrel $m$, and the mandrel secured between the center $l$, and mandrel $k$, the carriage D, being drawn back a suitable distance from the shaft B. Motion is given the shaft B, by the application of power to pulley $e$. The carriage D, by turning the screw E, is then moved up toward the shaft B, a suitable distance according to the diameter the hub is required to be, the carriage being prevented from moving casually by the rod H, which serves as a clamp, the pawl $t$, keeping the inner ends bearing against the under sides of the top flanches of the bed. When the carriage D, is moved forward the block A′, will be rotated in consequence of the worm wheel $n$, gearing into the screw $i$, of shaft C. The "stuff" A′, however is rotated quite slowly compared with the rotation of the cutter shaft B, so that when the "stuff" has made one revolution the cutter $d$, will have cut it in proper form. The operator then draws back the carriage D, by turning screw E, and when the carriage D, is drawn fully back, and the wheel $n$, is free from the screw $i$, the band $p$, will be tightened sufficiently to rotate the mandrel $k$, and the hub A′, will be comparatively rapidly rotated. The operator then throws forward the lever G, and the cutters $r$, $r$, cut off the ends of the hub. The carriage D, is then moved forward a little to slacken belt *p*, the finished hub removed, another block placed on the mandrel *m*, and the operation repeated. It will be understood that when the block or stuff is rotated through the medium of the screw and worm wheel gearing the belt *p*, is too slack to act at all on pulley *o*.

This machine has been practically tested, and it performs its work rapidly and in a perfect manner. The manipulation is simple, may be readily understood and performed by any person of ordinary ability.

Having thus described my invention what I claim as new and desire to secure by Letters Patent, is,

Rotating the mandrel *k*, of the carriage D, from the cutter shaft B, through the medium of the worm wheel and screw gearing *f*, *h*, *i*, *n*, as described, it being understood that I do not claim broadly and in the abstract the well known mechanical device of a worm wheel and screw gearing, but the parts above named when arranged with the cutter shaft B, and mandrel *k*, of the carriage D, so that the mandrel *k*, will be connected with the shaft B, and disconnected therefrom at the proper time by the movement of the carriage D, for the purpose described.

ALEXANDER RICKART.

Witnesses:
RALPH BREWSTER,
A. W. WEATHERWAX.